March 18, 1930.     A. M. WALSTROM     1,751,114
LUBRICATING DEVICE
Filed Feb. 23, 1929
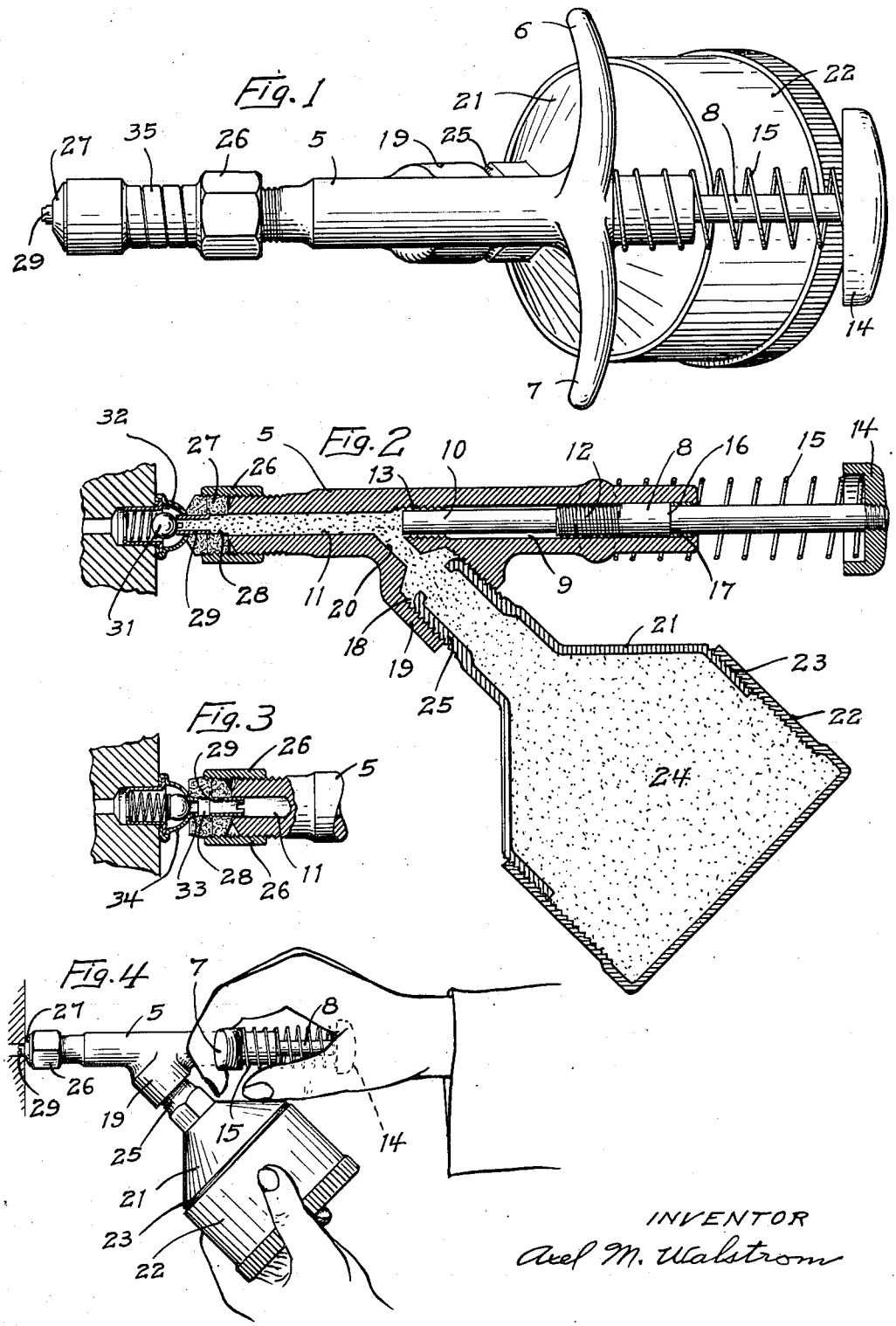
INVENTOR
Axel M. Walstrom Patented Mar. 18, 1930

1,751,114

UNITED STATES PATENT OFFICE

AXEL M. WALSTROM, OF MINNEAPOLIS, MINNESOTA

LUBRICATING DEVICE

Application filed February 23, 1929. Serial No. 342,058.

My invention relates to lubricating devices such as are used to force a lubricant into the journals and bearings of all types of machines and automotive vehicles.

The hand operated, high pressure, grease guns now in general use for this purpose consist of a cylindrical grease container connected with a comparatively small diameter discharge chamber into which a snug fitting plunger is arranged to be pressed to force the grease therein outwardly past a reversely tensioned check valve in the front end of said gun, and a spring actuated piston fitting within said container is intended to move the grease therein bodily toward said discharge chamber and force a small portion of said grease into the emptied chamber when said piston is withdrawn to its normal position.

I have learned from actual experience with these guns that the emptied discharge chamber thereof is thus only partly refilled with grease from the container, and under certain conditions no grease at all is forced thereinto by the combined pressures of the spring and atmosphere on the piston in said container, and for this reason I have found these guns very inefficient and unreliable. It would, however, be impractical to provide a large enough spring in these guns to exert sufficient pressure to displace a heavy grease as it would require a gun body of prohibitive size, and such a spring could not compensate for the variable pressures required by the varying consistency of grease of different kinds and at different temperatures. A grease thinned by a raise in temperature would be prematurely expelled from the gun by a spring sufficiently strong to displace the same grease in freezing temperature, and the pressure exerted by such spring would vary according to its degree of compression, from an excessive pressure with a full container to an insufficient pressure when extended the length of an emptied container.

It is therefore an object of my invention to provide a grease gun with manually actuated means which will positively displace the grease in its container without the use of spring or atmospheric pressure and regardless of the varying consistency of grease of different kinds and temperatures.

Another object of my invention is a grease gun of extremely simple construction which does not need the check valves, vacuum, spring and atmospheric pressure required with the grease guns now in common use.

A further object of my invention is a grease gun by which the grease may be expelled rapidly in a continuous flow where there is very little resistance to overcome, but which is also adapted to intermittently eject small portions of grease at high pressure where there is considerable resistance to overcome.

My invention consists, mainly, in a combination of primary and secondary grease ejectors, and wherein said primary ejector consists of a telescoping grease container having screw threaded members by which the grease therein can be rapidly expelled at a comparatively low pressure through the compression chamber of said secondary ejector, where a small diameter plunger is arranged whereby said grease may be expelled at a very high pressure.

My invention consists, further, of the several features which are shown and described in the following drawing, specification and claims:

In the drawing:

Fig. 1 is a full size side view of a grease gun embodying my invention, and

Fig. 2 is a longitudinal sectional view of same, showing its application to a grease receiving nipple.

Fig. 3 is a view, partly in section, showing the nozzle part of my invention applied to another type of grease receiving nipple, and Fig. 4 shows its application to a plain oil hole, and the manner of operation.

In all the views, numeral 5 indicates the barrel portion of my grease gun, and this barrel is provided with integral lugs 6 and 7 which extend on opposite sides near the rear end thereof to serve as finger grips, as will hereinafter appear. A plunger 8 is arranged to be reciprocated in the bore 9 in the rear end of said barrel, and this plunger has a front end 10 of reduced diameter which is adapted to act as a piston when moved forward into the discharge passage 11 in the front end of said barrel. The plunger 8 has an intermediate threaded portion 12 to cooperate with the threaded portion 13 in the bore 9, for the purpose hereinafter mentioned.

A button 14 is secured to the projecting rear end of the plunger 8, and a helical compression spring 15 is preferably provided on the rear end of the barrel 5 to engage said button and serves to maintain the plunger in its extended position with the shoulder 16 thereon in engagement with a stop 17 in the bore 9. A threaded recess 18 is provided in a boss 19 on one side of the barrel 5, and a duct 20 extends from this recess into the inner end of the discharge passage 11, as shown in Fig. 2.

The above described mechanism forms a simple and effective grease ejector by which, due to the small cross-sectional area of the piston 10 and passage 11, small portions of grease can be expelled at great pressure, but in order to make it a complete and reliable lubricating device it is necessary to provide it with means whereby it can be supplied with grease under sufficient pressure to completely refill the passage 11 after each stroke of the piston 10. For this purpose I prefer to provide a standard "grease cup", or its equivalent, which is composed of the telescoping members 21 and 22 having a screw threaded engagement at 23 by which sufficient pressure can be exerted on the grease 24 therein to force said grease through the passage 11. The member 21 has a threaded shank 25 which is screwed into the recess 18 for permanent attachment thereto. Some other type of force feed grease container may be attached thereto if desired, instead of the grease cup shown.

To adapt my invention for use with the different types of grease receiving nipples now is general use, I prefer to provide an interiorly threaded nozzle coupling 26 on the exteriorly threaded front end of the barrel 5, and a mouthpiece 27 of yielding material, such as leather of firm texture, projects from said coupling and has a central orifice 28 from which a pilot tube 29 projects. In Fig. 2 the pilot tube 29 is shown displacing the check valve 31 in a common type of grease receiving nipple 32, and the yielding mouthpiece 27 is shown in grease tight engagement with said nipple. In Fig. 3, the mouthpiece 27 is shown reversed in the nozzle to allow the projecting end 33 of the nipple 34 to enter the orifice 28 for sealed connection therewith. Fig. 1 shows how a flexible metallic hose 35 may be interposed between the gun barrel and the nozzle in order to reach grease receiving nipples which may be otherwise inaccessible. Please note that the front end of the barrel 5 is slightly pointed to insure snug contact with the mouthpiece 27, and also that it is provided with a standard form of thread to which other types of nozzles with standard fittings may be attached.

In operation:—The gun is grasped in the right hand as shown in Fig. 4, with the button 14 resting in the palm of the hand and the fingers of said hand engaging the lugs 6 and 7. The grease cup member 22 is then given a slight turn to the right by the fingers of the left hand, as shown, to force a portion of the grease 24 into the passage 11. The operator then places the nozzle of the gun into firm contact with the grease receiving nipple where it is held while pressure is exerted on the button 14 by the palm of the right hand, and this pressure is then greatly increased with a forceful pull on the lugs 6 and 7 by the fingers of the right hand. In this manner a considerable pressure is placed on the grease in the passage 11 by the plunger 10 to force said grease into grease ducts which offer considerable resistance, and to further increase this pressure the operator can screw said plunger into the threaded portion of the bore 9 and thus obtain an increased leverage for forcing grease through clogged ducts.

This device can also be used as an ordinary low pressure grease gun for the rapid filling of grease cups, gear housings, wheel hubs and such places where there is slight resistance to overcome, and this can be accomplished by simply turning the member 22 which will cause the grease to flow rapidly through the unobstructed passage 11.

This device is also adapted for the use of "hard grease" which is too thick to be used with the present guns, and which is preferred to the thinner "grease gun grease" in the bearings of certain machines which operate in higher temperatures.

I claim:

1. A high pressure grease gun provided with a discharge nozzle, a reversible mouthpiece of yielding material projecting from the front end of said nozzle, a central orifice extending through said mouthpiece, and a projecting pilot tube secured in one end of said orifice, substantially as described.

2. A push type grease gun having a slightly pointed front end, a nozzle detachably secured to said front end, a reversible mouthpiece of yielding material projecting from the front end of said nozzle and the rear face of said mouthpiece engaging the pointed front end of said gun, a central orifice extending through said mouthpiece, and a projecting pilot tube secured in one end of the orifice in said mouthpiece, substantially as described.

In witness whereof, I have hereunto set my hand this 21st day of February, 1929.

AXEL M. WALSTROM.